United States Patent
Chou et al.

(10) Patent No.: US 8,113,692 B2
(45) Date of Patent: Feb. 14, 2012

(54) LIGHT SOURCE MODULE FOR GENERATING POLARIZED LIGHT

(75) Inventors: Jung-Tsung Chou, Taoyuan County (TW); Hui-Lung Kuo, Taipei (TW); Pin-Chen Chen, Taipei (TW); Yi-Ying Lai, Hsinchu (TW); Sheng-Wen Lin, Sanchong (TW)

(73) Assignee: Industrial Technology Research Institute, Hsinchu (TW)

( * ) Notice: Subject to any disclaimer, the term of this patent is extended or adjusted under 35 U.S.C. 154(b) by 458 days.

(21) Appl. No.: 12/371,969

(22) Filed: Feb. 17, 2009

(65) Prior Publication Data
US 2010/0142048 A1    Jun. 10, 2010

(30) Foreign Application Priority Data
Dec. 5, 2008    (TW) ................... 97147557 A

(51) Int. Cl.
*F21V 7/00*    (2006.01)
(52) U.S. Cl. ...... 362/307; 362/19; 362/223; 362/217.05
(58) Field of Classification Search .......... 362/297–298, 362/307–308, 296.05, 296.07, 217.01, 299–300, 362/222–224, 327, 239, 311.01, 311.06, 362/311.09, 217.02, 217.04–217.05, 217.07–217.08, 362/260, 296.01
See application file for complete search history.

(56) References Cited

U.S. PATENT DOCUMENTS

| | | | |
|---|---|---|---|
| 3,767,288 A * | 10/1973 | Gross | 359/488.01 |
| 5,486,949 A | 1/1996 | Schrenk et al. | |
| 5,583,702 A * | 12/1996 | Cintra | 359/743 |
| 5,729,311 A | 3/1998 | Broer et al. | |
| 5,828,488 A | 10/1998 | Ouderkirk et al. | |
| 5,965,247 A | 10/1999 | Jonza et al. | |
| 6,210,785 B1 | 4/2001 | Weber et al. | |
| 6,268,961 B1 | 7/2001 | Nevitt et al. | |
| 6,285,423 B1 | 9/2001 | Li et al. | |
| 6,927,911 B2 | 8/2005 | Tsai et al. | |
| 7,027,671 B2 | 4/2006 | Huck et al. | |
| 7,072,544 B2 | 7/2006 | Cornelissen et al. | |
| 7,265,800 B2 | 9/2007 | Jagt et al. | |
| 7,580,198 B2 * | 8/2009 | Park et al. | 359/668 |
| 2004/0165391 A1 * | 8/2004 | Blacker et al. | 362/346 |
| 2004/0174594 A1 * | 9/2004 | Shikano | 359/484 |

FOREIGN PATENT DOCUMENTS
TW    M341810    10/2008

* cited by examiner

*Primary Examiner* — Julie Shallenberger
(74) *Attorney, Agent, or Firm* — Rabin & Berdo, P.C.

(57) ABSTRACT

A light source module for generating polarized light includes a light emitting element, a reflector, and an optical element. The light emitting element generates a light ray, and the reflector reflects the light ray towards the optical element. The optical element includes a light splitting face and a reflection face. The light splitting face receives the light ray, and an angle between the light splitting face and the incident light ray is at about a Brewster's Angle. After the light ray is irradiated to the light splitting face, the light ray is divided into a refraction light and a reflection light. The reflection face reflects the refraction light, and the reflection face is substantially perpendicular to a path of the refraction light. Therefore, a light source with a high degree of polarization is realized by a design of the light splitting face and the reflection face.

20 Claims, 13 Drawing Sheets

LIGHT SOURCE MODULE FOR GENERATING POLARIZED LIGHT

CROSS-REFERENCE TO RELATED APPLICATIONS

This non-provisional application claims priority under 35 U.S.C. §119(a) on Patent Application No(s). 097147557 filed in Taiwan, R.O.C. on Dec. 5, 2008 the entire contents of which are hereby incorporated by reference.

BACKGROUND OF THE INVENTION

1. Field of Invention

The present invention relates to a light source module, and more particularly to a light source module capable of generating polarized light.

2. Related Art

In a sequence of a light ray traveling path, a structure of a liquid crystal display includes a backlight source, a first polarizer, a liquid crystal panel, and a second polarizer. The backlight source is used to generate a plane light source as uniform as possible. The plane light source is unpolarized light, and may be divided into two polarized light sources orthogonal to each other, which are defined as P light polarized in parallel with the incident plane and S light polarized perpendicular to the incident plane, commonly known as S type and P type. The first polarizer is used to select the light in a certain linear polarization direction to enter the liquid panel, and a polarization direction of the second polarizer is usually perpendicular to the first polarizer, so as to select light output by the display.

In liquid crystal display application, a light source has to be a polarized light source. The conventional way is using a polarizer to filter out polarized light of a single type, under the principle that the polarization component parallel to an absorption axis of the polarizer in the plane light source is absorbed, while the polarization component perpendicular to the absorption axis passes through the polarizer. As a polarization direction of an unpolarized light source is random, after the unpolarized light source passes through a polarizer, with a transmission loss deducted, an amount of the polarized light transmitted after filtering is less than 50% of a total amount of the unpolarized light source, that is to say, the utilization efficiency usually fails to surpass 50%. Therefore, if a degree of polarization of the backlight source may be increased, an energy loss of the light source may be effectively decreased at the polarizer, or even a polarizer (the first polarizer) may be removed.

Different technologies are used to obtain polarized light in the industry, including a reflective polarizer (DBEF, Dual Brightness Enhancement Film), a polarized light guide plate utilizing a selective total internal reflection (Selective TIR) structure, and a polarized light guide plate with a beam splitting structure plus a quarter wave plate.

The first technology (DBEF) may be found in U.S. Pat. Nos. 5,486,949, 5,828,488, 5,965,247, 6,210,785, and 6,268,961, which relate to a reflective polarizer technology. The DBEF may enable some polarized light to pass through, and reflect the orthogonal polarized light. The orthogonal polarized light that fails to be used is reflected to a backlight module for recycling use to achieve better light-emitting efficiency. In theory, the light may keep being filtered and recycled until all light rays are polarized in the same direction. A practical efficiency gain approaches 60%.

The second technology (selective TIR) may be found in U.S. Pat. Nos. 5,729,311, 7,072,544, 7,027,671, and 7,265,800. This type of architecture at least includes a layer of isotropy material as well as a layer of anisotropy material, so that a polarization selection may be achieved mainly by utilizing birefringent characteristics of the material. Such architecture is normally referred to as a selective TIR architecture.

The third technology may be found in U.S. Pat. Nos. 6,285,423, and 6,927,911, and the main structure thereof includes a prism structure placed at the bottom of a light guide plate, a layer of thin-film polarization beam splitter (PBS) between the light guide plate and the prism structure, a layer of quarter wave plate facing an end face opposite to light incident plane of the light guide plate, and a reflective surface stuck outside the quarter wave plate. The operating principle is described as follows. Light enters obliquely from the incident plane of the light guide plate. When the light ray reaches the thin-film PBS, P light penetrates the thin-film PBS and S light is reflected. After the penetrated P light is reflected by a prism structure, the P light is emitted out of the light guide plate in a small angle. The reflected S light continues its TIR propagation within the light guide plate, until the S light is transmitted through the quarter wave plate and is reflected by the reflective surface to pass through the quarter wave plate again. After the S light passes through the quarter wave plate twice, the S light is converted into a P light. Therefore, the P light may pass through the thin-film PBS and reflected out by the prism structure.

From the introductions above, it can be seen that a light source module capable of generating polarized light is very helpful in application of liquid crystal display industry.

SUMMARY OF THE INVENTION

The present invention is directed to a light source module for generating polarized light in an operating principle different from the above mentioned conventional technologies.

The present invention provides a light source module for generating polarized light, which includes a light emitting element, and an optical element. The light emitting element generates light rays. The optical element has a light splitting face and a reflection face. The light splitting face receives the light ray. An incident angle provided for the light ray to be incident on the light splitting face is within a range from a Brewster's Angle −15 degrees to the Brewster's Angle +15 degrees, which provides a PS ratio (P light:S light) over 1:6. After the light ray is irradiated to the light splitting face, the light ray is divided into a refraction light and a reflection light. The reflection face receives and reflects the refraction light, and the reflection face is substantially perpendicular to a path of the refraction light.

The optical element is a strip element. A first plane is perpendicular to a major axis of the strip element through the light emitting element. An intersection line between the light splitting face and the first plane is an incident curve, and an intersection line between the reflection face and the first plane is a reflection curve. An incident angle provided for the light ray to be incident on the incident curve is within the scope of Brewster's Angle −15 degrees to a Brewster's Angle +15 degrees. The reflection curve is substantially perpendicular to a path of the refraction light.

The light emitting element has a reflector on the other side opposite to the optical element, so as to reflect the light ray towards the optical element.

The reflection curve is divided into a plurality of sections. A distance from the reflection curve to the refraction curve (along the refraction light path) within each section is continuous, while a distance between a section and another section is not continuous. A connecting line between the sections substantially overlays the path of the refraction light at the connection location.

By a suitable arrangement of the light emitting element and the optical element, after the light ray passes through the light splitting face, 15% of S polarized light (i.e., the reflection light) is reflected. The rest light ray (i.e., the refraction light) is refracted into the optical element. After the refraction light is irradiated to the reflection face, the refraction light is then reflected and returns to the light splitting face and the light emitting element sequentially along an original path. Subsequently the refraction light is reflected by the reflector and enters the optical element. After repetition of this process, a high degree of S polarized light is then obtained.

To clarify the above-mentioned and other objectives, features and advantages of the present invention, embodiments according to the present invention are illustrated in detail in the following in conjunction with the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
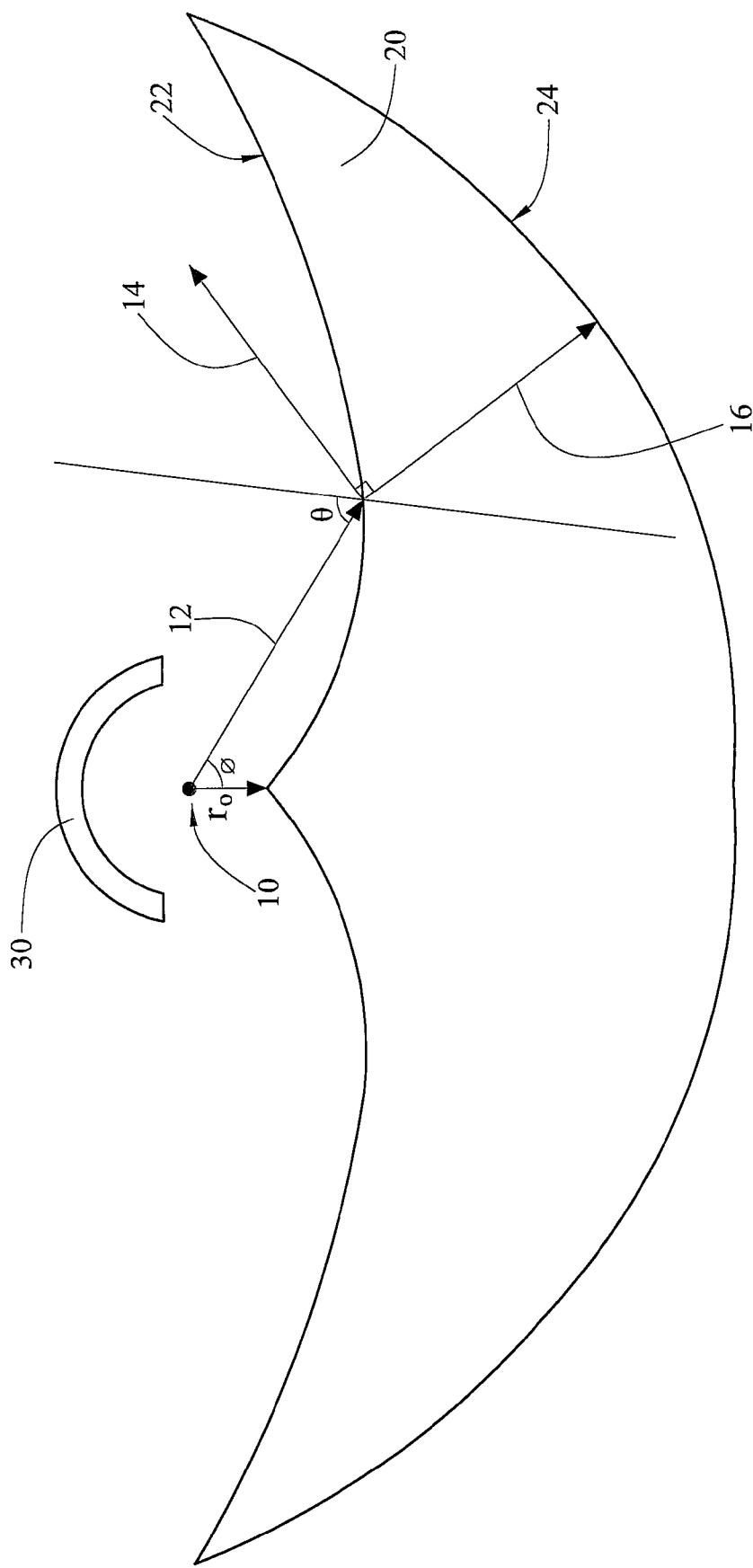
FIG. 1 is a schematic view of a first embodiment according to the present invention.

Referring to FIG. 1, a first embodiment of the present invention is a light source module for generating polarized light. The light source module includes a light emitting element 10, an optical element 20, and a reflector 30. The light emitting element 10 may be any element capable of generating a light ray 12, for example, a point light source such as a Light Emitting Diode (LED). The first embodiment takes the point light source as an example. However, the light emitting element 10 may also be a line light source such as a cold cathode fluorescent lamp (CCFL), or a LED group arranged in a line.

The optical element 20 has a light splitting face 22 and a reflection face 24. The light splitting face 22 receives the light ray 12. An incident angle θ provided for the light ray 12 to be incident to the light splitting face 22 is within a range from a Brewster's Angle ($\theta_B$)–15 degrees to $\theta_B$+15 degrees. After the light ray 12 is irradiated to the light splitting face 22, the light ray 12 is divided into a refraction light 16 and a reflection light 14. The reflection face 24 receives and reflects the refraction light 16, and the reflection face 24 is substantially perpendicular to a path of the refraction light 16.

The reflector 30 is disposed on one side of the light emitting element 10, so as to reflect the light ray 12 towards the optical element 20. A location of the reflector is on the other side of the light emitting element 10 opposite to the optical element 20. A surface of the reflector 30 may be any surface capable of changing a polarization state, including a scattering face, or a surface with Birefringent characteristics (for example, Quarter wave plate). It is preferred that the reflector 30 reflects the light ray not over the area of the optical element 20.

Because the incident angle θ is within the range from $\theta_B$–15 degrees to $\theta_B$+15 degrees, almost all P polarized component of the incident light ray 12 is refracted into the optical element 20, that is, the reflection light approaches pure S polarized light, which will be further discussed below. The refraction light 16 passing through the light splitting face 22 contacts with the reflection face 24. As the reflection face 24 is perpendicular to the refraction light 16, the refraction light 16 is reflected back to the light splitting face 22 along an original path and then returns to the light emitting element 10 again along the path of the light ray 12 after passing through the light splitting face 22. After such reflections and refractions, S polarized light is filtered one by one, and a highly pure S polarized light is thus obtained.

Figure 2:
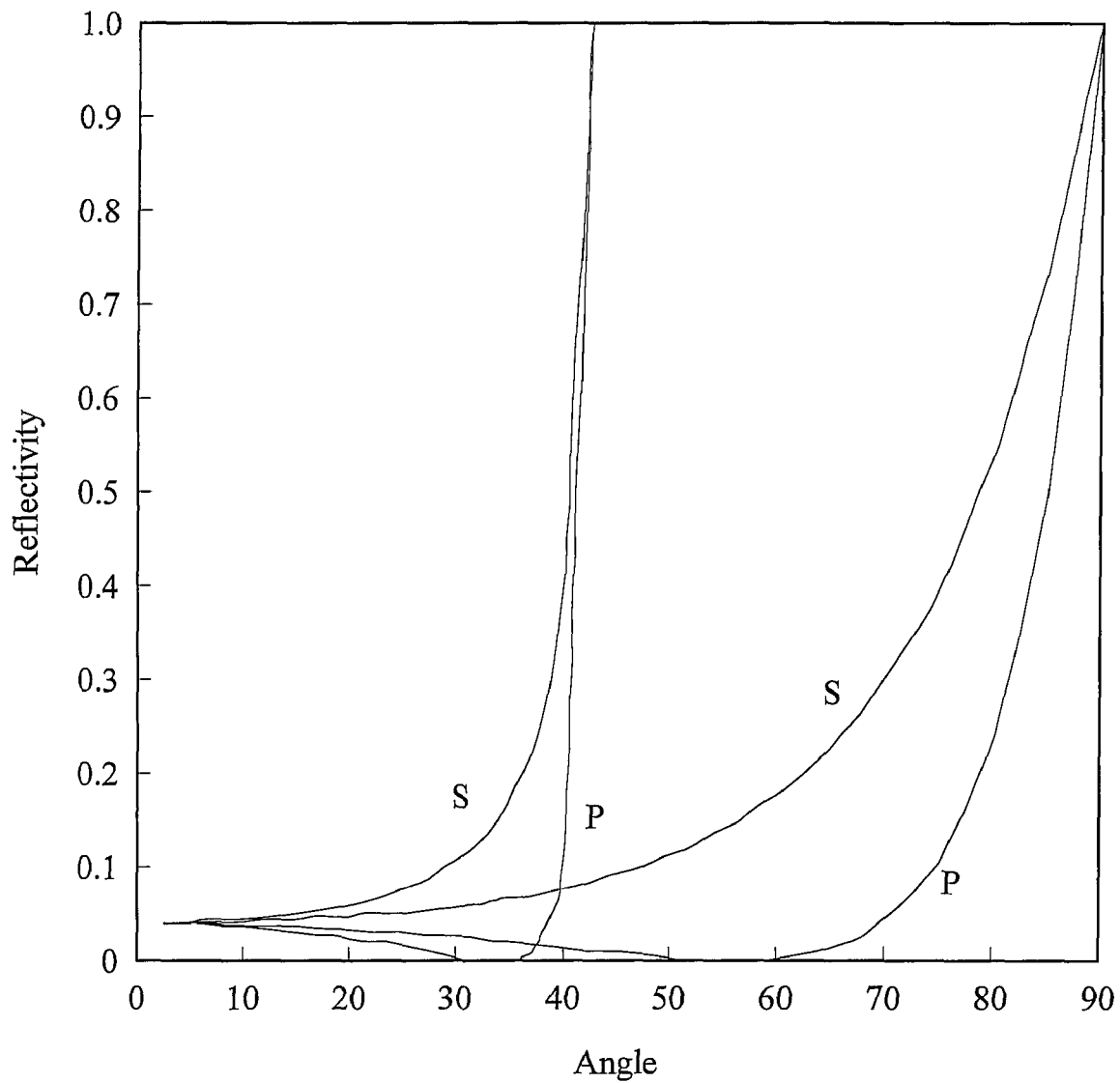
FIG. 2 is a relation diagram between an incident angle and a reflectivity in the first embodiment according to the present invention.

FIG. 2 is a relation diagram of an incident angle and a reflectivity in the first embodiment. The optical element 20 employs a material having a refraction index of 1.5, the horizontal axis indicates the incident angle, and the perpendicular axis indicates the reflectivity. A curve labeled with P represents that the curve is a reflectivity curve of the P polarized light, and similarly, a curve labeled with S represents a reflection curve of the S polarized light. It may be seen from the drawing that the light ray 12 are incident to the optical element 20 with different incident angles θ and obtained a reflection ratio between the P polarized light and the S polarized light. For example, when a light ray is incident from the air to the optical element, if the incident angle θ is about 56 degree, all P polarized light enters into the optical element 20, and about 15% of S polarized light is reflected back. At this time, 56 degree is a Brewster's Angle of an external reflection. On the contrary, when the light ray is emitted from the optical element 20 towards the air, if the incident angle θ is about 34 degree, all the P polarized light is irradiated to the air, and about 15% of the S polarized light is reflected back to the optical element. At this time, 34 degree is a Brewster's Angle of an internal reflection.

Therefore, as can be seen from FIG. 2, to make a reflection ratio between the S polarized light and the P polarized light higher than 10:1 so as to increase a purity of the S polarized light, an angle incident from the air to the optical element 20 may be within the range from $\theta_B+15$ degrees to $\theta_B-15$ degrees. But in consideration of the situation that the refraction light 16 is incident to the light splitting face 22 again after being reflected back along the original path by the reflection face 24, to obtain a ratio of 10:1 between the S polarized light and the P polarized light, the incident angle is supposed to fall between $\theta_B+5$ degrees and $\theta_B-5$ degrees. Thus, in respect of design, it is most preferred that an incident angle between the light splitting face 22 and the light ray 12 is substantially equal to the Brewster's Angle $\theta_B$, or less preferred one is between $\theta_B+5$ degrees and $\theta_B-5$ degrees. If applicable, the angle is within a scope from $\theta_B+15$ degrees to $\theta_B-15$ degrees.

As can be seen from the description above, only the refraction light 16 enters the optical element 20 with the incident angle of $\theta_B$. The refraction light 16 includes 100% of the P polarized light and 85% of the S polarized light (as compared with the incident light ray 12). After the refraction light 16 is totally reflected along original path, it passes through the light splitting face 22 again and returns to the light emitting element 10, finally approaches the surface of the reflector 30. The polarization state thereof is evenly distributed and reflected back to the optical element 20 again. In such a way, highly pure S polarized light may be obtained by filtering the light ray 12 repeatedly.

The optical element may be made of any transparent material. The material may be, but not limited to, glass, PC plastic (Polycarbonate), acrylic (poly-methyl methacrylate (PMMA), polyethylene terephthalate (PET) plastic, PS plastic (Polystyrene), or polyethylene naphthalate (PEN) plastic.

An outer surface of the reflection face 24 may have a reflection coating, so as to reflect the refraction light. The reflection coating may be, but not limited to, a metal film.

Figure 3:
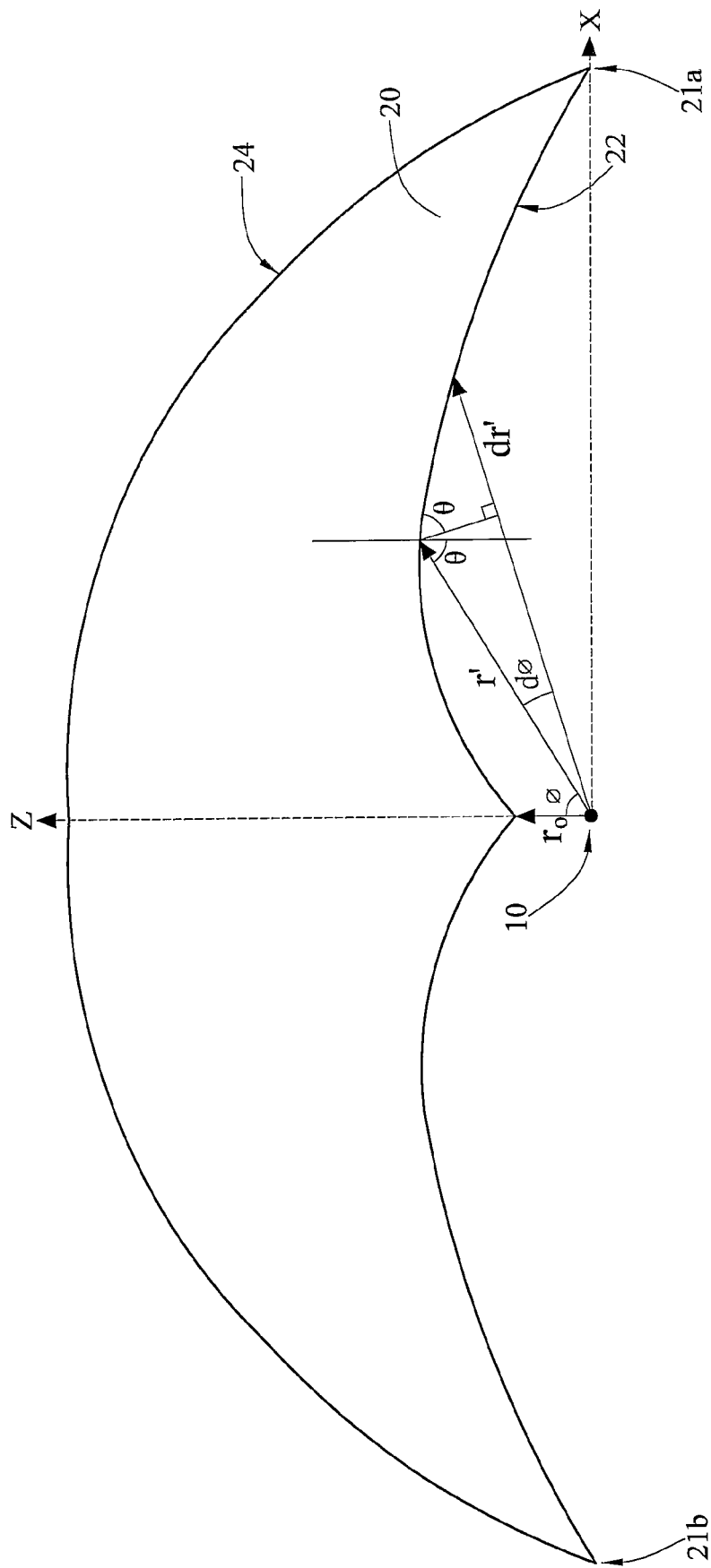
FIG. 3 is a schematic view of a curved profile of a light splitting face in the first embodiment according to the present invention.

An embodiment of a curved profile of the light splitting face is described with reference to FIG. 3. A path distance of the light ray 12 being emitted from the light emitting element 10 to be in contact with the light splitting face 22 is r. The shortest path distance among all incident path distances in FIG. 3 is $r_0$. An included angle between r and $r_0$ is $\phi$. The incident angle is $\theta$. Thus, dr is as shown in the following:

$$dr = rd\phi \tan\theta \quad \text{Formula (1)}$$

Furthermore, the Formula (1) is integrated from $r_0$ to r. At the same time, $\phi$ is from 0 to $\phi$ correspondingly. Therefore, a Formula (2), a Formula (3) and a Formula (4) are obtained:

$$\int_{r_0}^{r} \frac{1}{r'} dr' = \tan\theta \int_0^{\phi} d\phi' \quad \text{Formula (2)}$$

$$\ln r' \Big|_{r_0}^{r} = \tan\theta \cdot \phi' \Big|_0^{\phi} \quad \text{Formula (3)}$$

$$\ln r = \tan\theta \cdot \phi + \ln r_0 \quad \text{Formula (4)}$$

Finally, a Formula (5) is obtained by taking a natural exponential to the Formula (4):

$$r = r_0 e^{\tan\theta \cdot \phi} \quad \text{Formula (5)}$$

Therefore, the light splitting face of the present invention satisfies the relation of the Formula (5), in which r represents a distance between each point of the light splitting face and the light emitting element, and $r_0$ represents the shortest distance between the light splitting face and the light emitting element, $\theta$ falls within a range from $\theta_B-15$ degrees to $\theta_B+15$ degrees, $\phi$ is an included angle between r and $r_0$.

Figure 4:
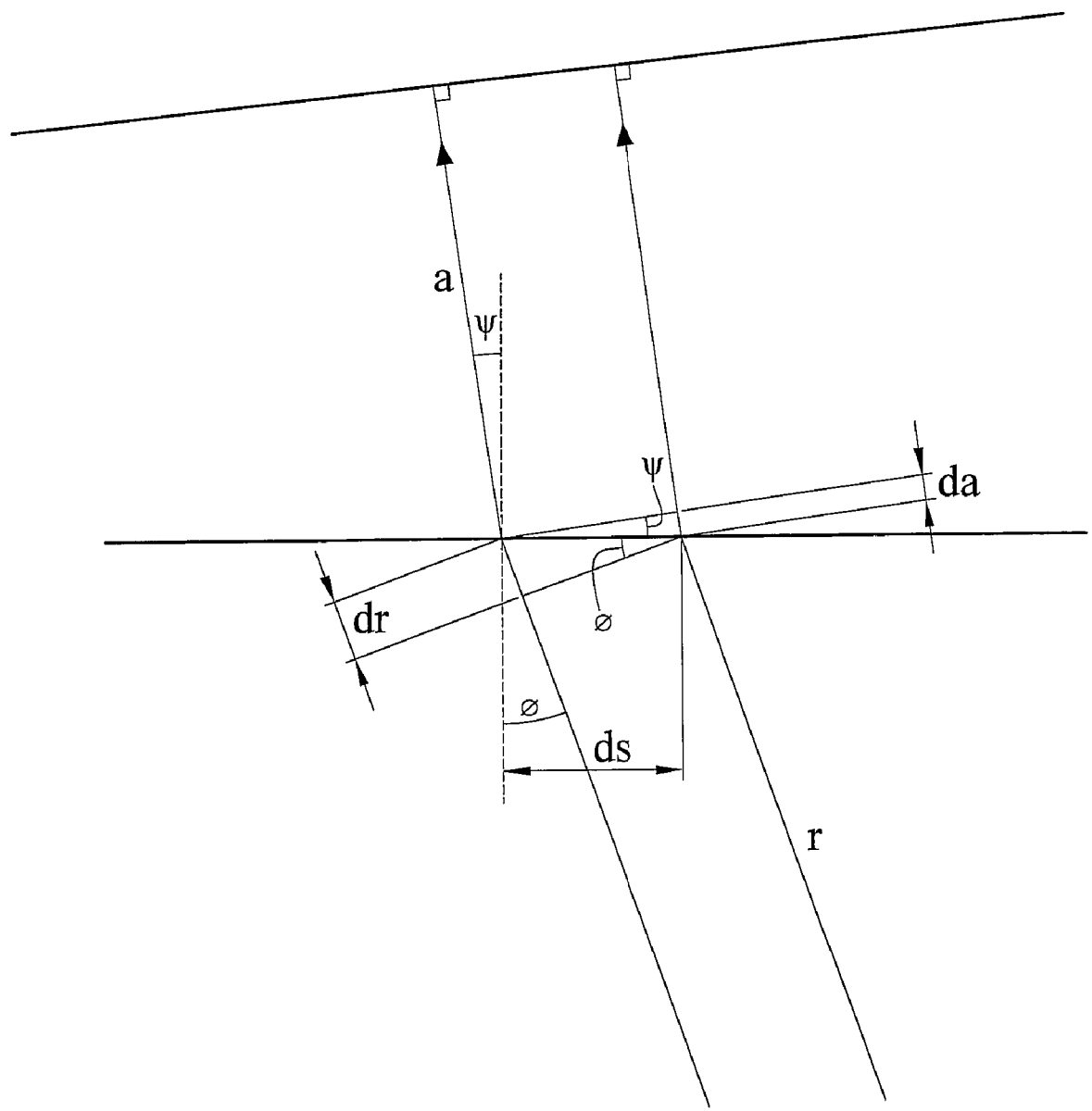
FIG. 4 is a schematic view of a curved profile of a reflection face in the first embodiment according to the present invention.

Next, FIG. 4 is schematic view of an embodiment of a curved profile of the reflection face 24 according to the present invention. a is a path length of the refraction light 16 from the light splitting face 22 to the reflection face 24 (i.e., a path distance of light). $a_0$ is a path distance of the refraction light 16 from the light splitting face 22 to the reflection face 24 corresponding to $r_0$. $\phi$ is an incident angle of the light ray 12 incident to the light splitting face 22. $\Psi$ is a refraction angle of the light ray after passing through the light splitting face 22. Thus, a relation between da and ds may be obtained as follows:

$$da = -ds \cdot \sin\psi \quad \text{Formula (6)}$$

$$ds = \frac{dr}{\sin\phi} \quad \text{Formula (7)}$$

The Formula (7) is substituted in the Formula (6) to obtain:

$$da = -\frac{dr}{\sin\phi} \cdot \sin\psi \quad \text{Formula (8)}$$

The following Formula (9) is obtained from refraction equation (Snell's law). $n_1$ is a refractive index of a medium between the optical element 20 and the light emitting element 10. The medium is usually air that is 1. $n_2$ is a refractive index of the optical element, and taking the above as an example, $n_2$ is 1.5.

$$n_1 \sin\phi = n_2 \cdot \sin\Psi \quad \text{Formula (9)}$$

The Formula (9) is substituted in the Formula (8) and the obtained Formula is integrated from $r_0$ to r. Therefore, the corresponding change of a is from $a_0$ to a, and a Formula (10) is obtained:

$$\int_{a_0}^{a} da' = -\frac{n_1}{n_2} \int_{r_0}^{r} dr' \quad \text{Formula (10)}$$

After the integration, a Formula (11) is obtained:

$$a - a_0 = -\frac{n_1}{n_2} \cdot (r - r_0) \quad \text{Formula (11)}$$

The Formula (11) is modified to obtain a Formula (12):

$$a = \frac{n_1}{n_2} \cdot (r_0 - r) + a_0 \quad \text{Formula (12)}$$

Thus, a reflection face of the present invention conforms to a relation of the Formula (12). The path distance of the refraction light 16 from the light splitting face 22 to the reflection face 24 is a, the path distance of the refraction light 16 from the light splitting face 22 to the reflection face 24 corresponding to $r_0$ is $a_0$. $n_1$ is the refractive index of the medium between the optical element 20 and the light emitting element 10. The medium is usually the air. Therefore, $n_1$ is 1, and $n_2$ is the refractive index of the optical element.

Figure 5:
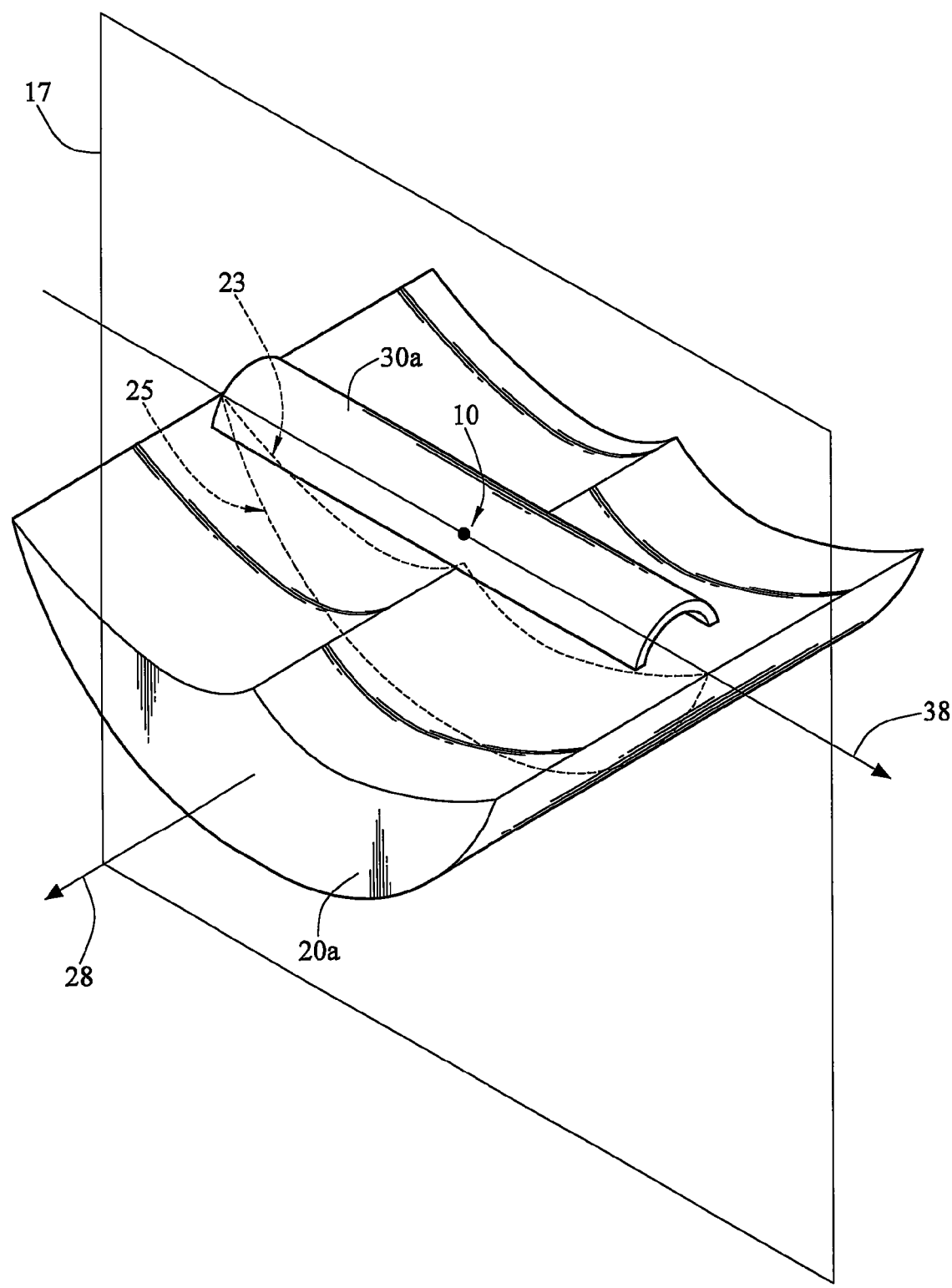
FIG. 5 is a schematic structural view of a second embodiment according to the present invention.

FIG. 5 is a schematic view of a second embodiment according to the present invention. The light emitting element 10 is a point light source. The optical element 20a is a strip element. The optical element 20a has a major axis 28. The major axis 28 of the optical element 20a is perpendicular to a first plane 17 passing through the light emitting element 10. Thus, an intersection line between the first plane 17 and the light splitting face 22 is an incident curve 23, and an intersection line between the reflection face 24 and the first plane 17 is a reflection curve 25. An incident angle provided for the light ray 12 to be incident to the incident curve 23 is within a range from $\theta_B-15$ degrees to $\theta_B+15$ degrees. The reflection curve 25 is substantially perpendicular to a path of the refraction light 16. A difference between the second embodiment and the first embodiment is that the reflector 30a of the second embodiment is a strip reflector. A major axis 38 of the reflector 30a is on the first plane 17 and is perpendicular to the major axis 28 of the optical element 20a. In such a manner, the light ray may be suppressed to irradiate in the direction of the major axis 28 of the optical element 20a.

Figure 6:
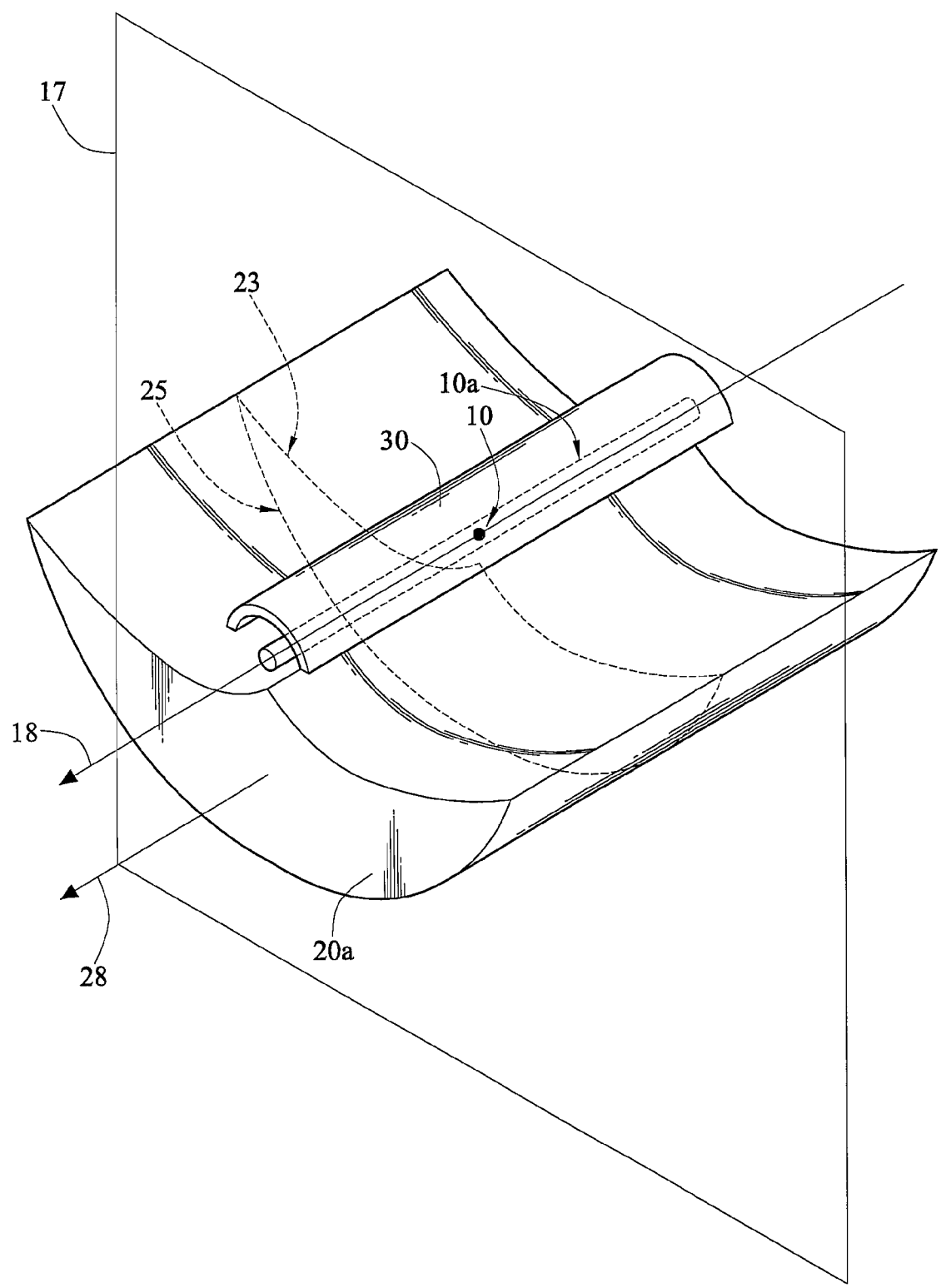
FIG. 6 is a schematic structural view of a third embodiment according to the present invention.

FIG. 6 is a schematic view of a third embodiment according to the present invention. The light emitting element 10a is a line light source, and the optical element 20a is a strip element. The major axis 18 of the light emitting element 10a is parallel to the major axis 28 of the optical element 20a. A first plane 17 is perpendicular to the major axis 18 of the light emitting element 10a. The first plane is also perpendicular to the major axis 28 of the optical element 20a. Thus, the intersection line between the first plane 17 and the light splitting face 22 is the incident curve 23, and the intersection line between the reflection face 24 and the first plane 17 is a reflection curve 25. An incident angle provided for the light ray 12 to be incident to the incident curve 23 is within a range from $\theta_B-15$ degrees to $\theta_B+15$ degrees. The reflection curve 25 is substantially perpendicular to a path of the refraction light 16.

In the above mentioned second and third embodiments, a sectional shape of the optical element 20a in a plane parallel to the first plane 17 is a profile formed of the incident curve 23 and the reflection curve 25.

Figure 7:
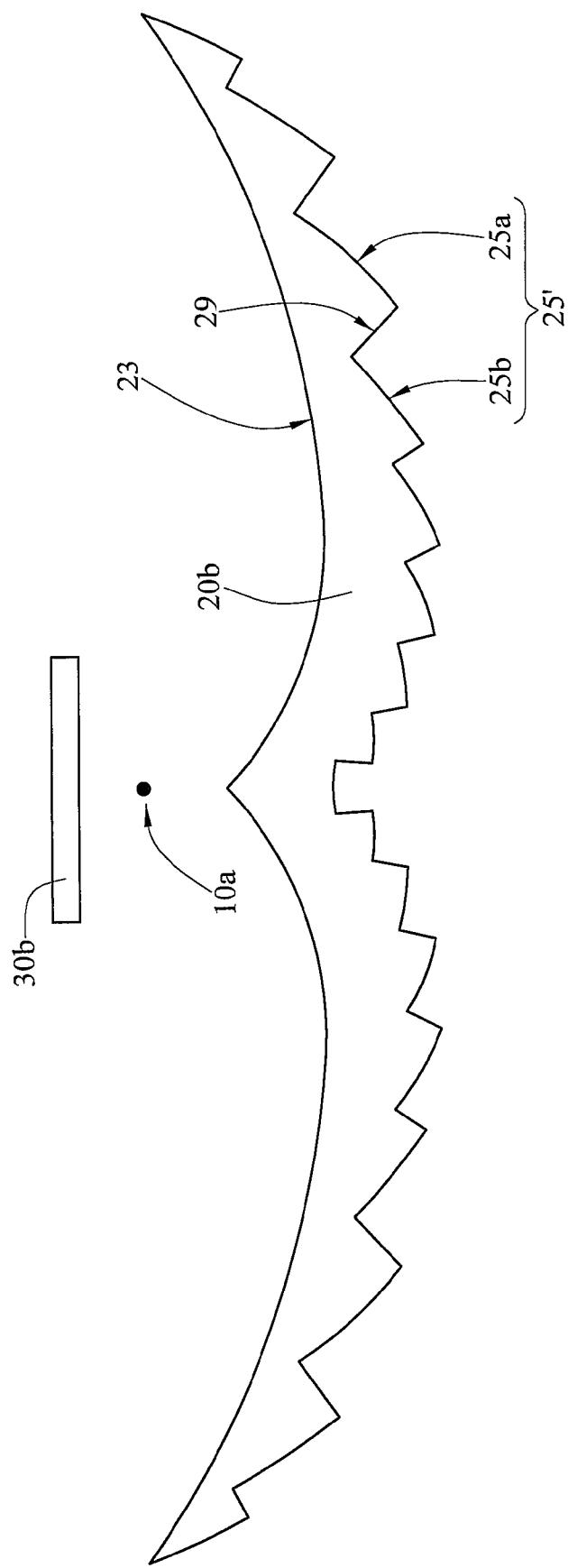
FIG. 7 is a schematic structural view of a fourth embodiment according to the present invention.

The reflection face 24 and the reflection curve 25 of the optical element 20, 20a in the foregoing first, second, and third embodiments have continuous profiles. In order to decrease a total thickness of the optical elements 20, 20a, the optical elements 20, 20a may be designed as a discontinuous curved surface. Referring to FIG. 7, it may be understood that a fourth embodiment of the present invention includes a light emitting element 10, an optical element 20b, and a reflector 30b. The reflector 30b is a plane reflector. The optical element has an incident curve 23 and a reflection curve 25'. The reflection curve 25' has a plurality of sectional curves 25a, 25b. Each of the sectional curves 25a, 25b is perpendicular to a path of the refraction light 16, and each of sectional curves 25a, 25b is a curve with continuous slope. A connecting line 29 between the sectional curves 25a, 25b substantially overlays the path of the refraction light 16 at the connection location. In such a manner, the refraction light 16 is still reflected by the reflection curves 25a, 25b and returns along the original path. The path of the refraction light 16 will not be influenced in the presence of the connecting line.

As for the reflectors 30, 30a, 30b used in the embodiments of the present invention, a surface thereof facing the light emitting element 10 may be, but not limited to, a scattering surface, a surface with Birefringent characteristics, a surface of a liquid crystal film, a surface of a polyethylene terephthalate (PET) film, a surface of a polyethylene naphthalate film (PEN), and the like optical anisotropic materials. If the reflectors 30, 30a, 30b employ a curved surface reflector, the curved surfaces of the reflectors 30, 30a may be designed depending on the light emitting element 10 as a focus, for example, but not limited to, a spherical surface or a paraboloid.

Figure 8A:
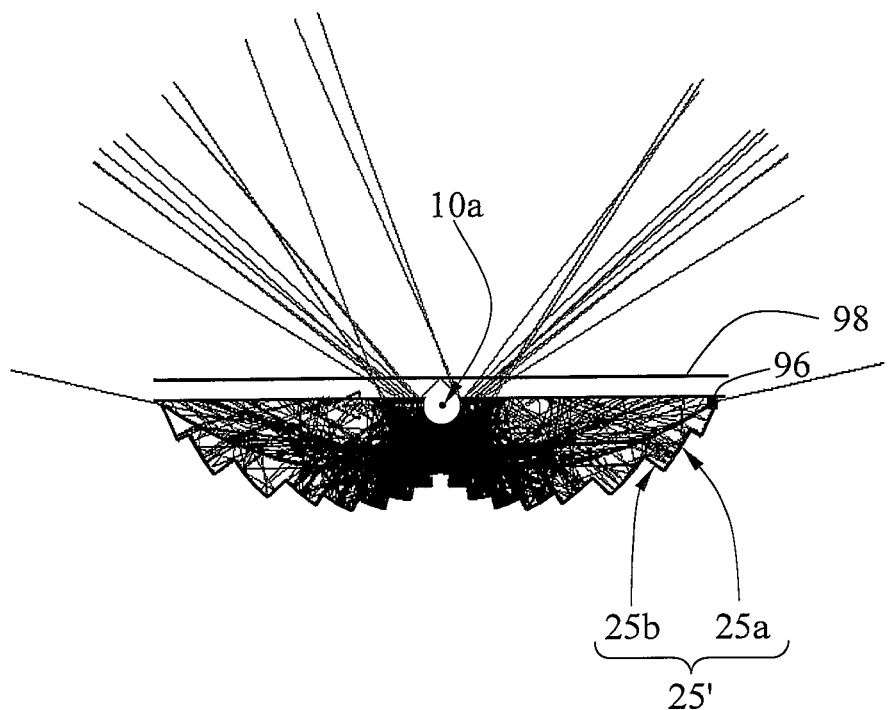
FIGS. 8A and 8B are schematic views of tests for generating P polarized light and S polarized light respectively in the fourth embodiment according to the present invention.
Figure 8B:
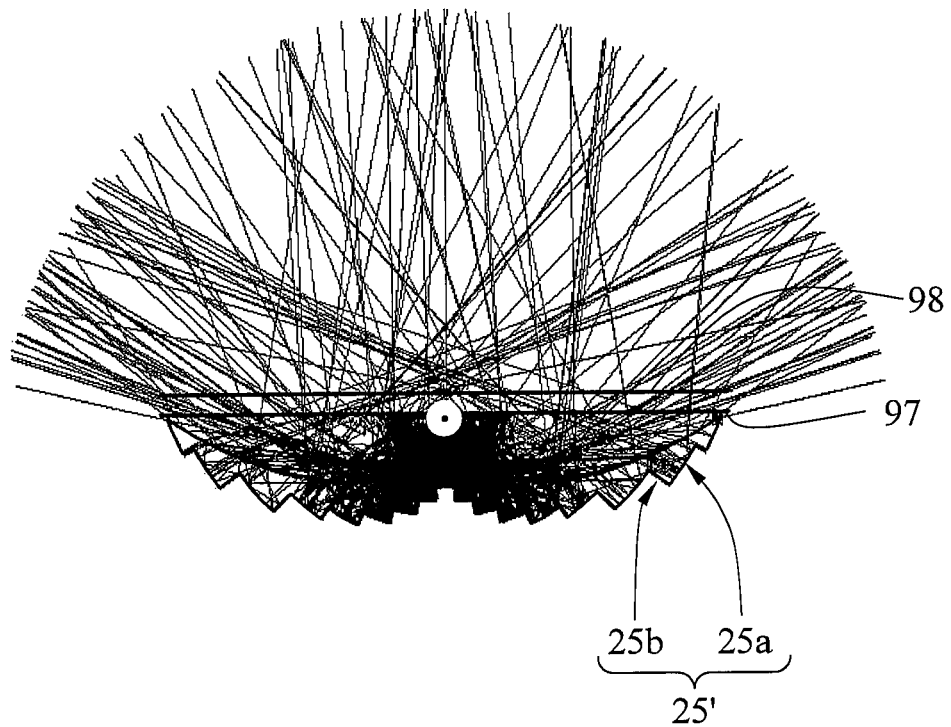
Figure 9A:
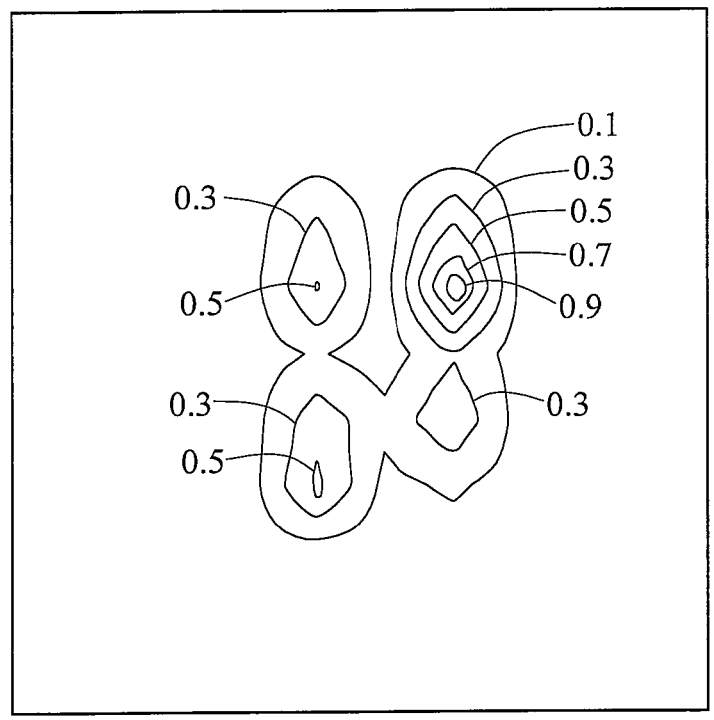
FIGS. 9A and 9B is are intensity distribution diagrams for generating the P polarized light and S polarized light respectively in the fourth embodiment according to the present invention, represented in a manner of iso-intensity contour.
Figure 9B:
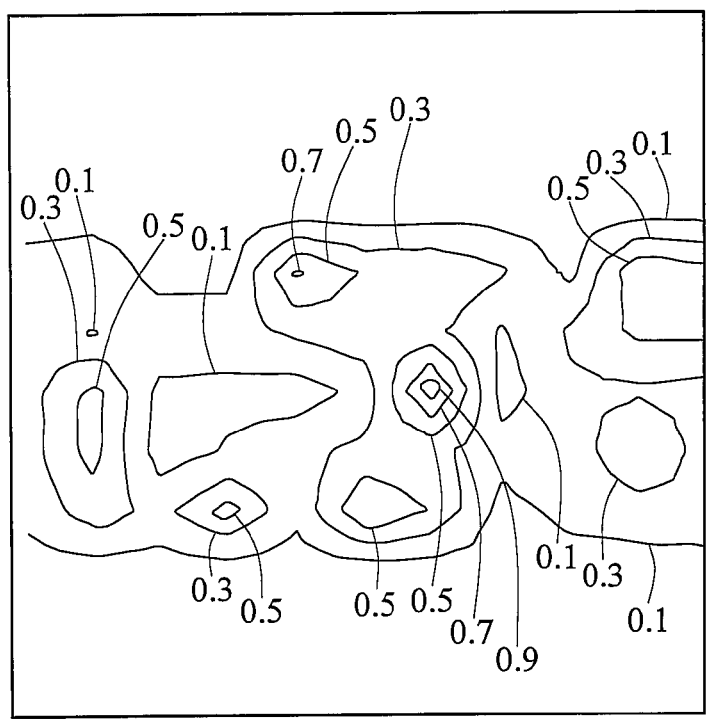
Figure 10A:
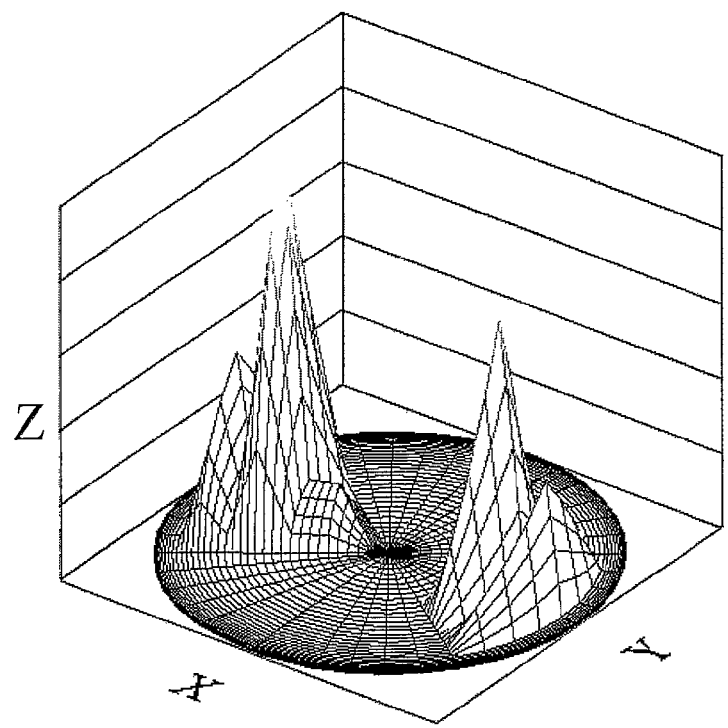
FIGS. 10A and 10B are luminance distribution diagrams for generating the P polarized light and S polarized light respectively in the fourth embodiment according to the present invention, represented in a manner of angular distribution.
Figure 10B:
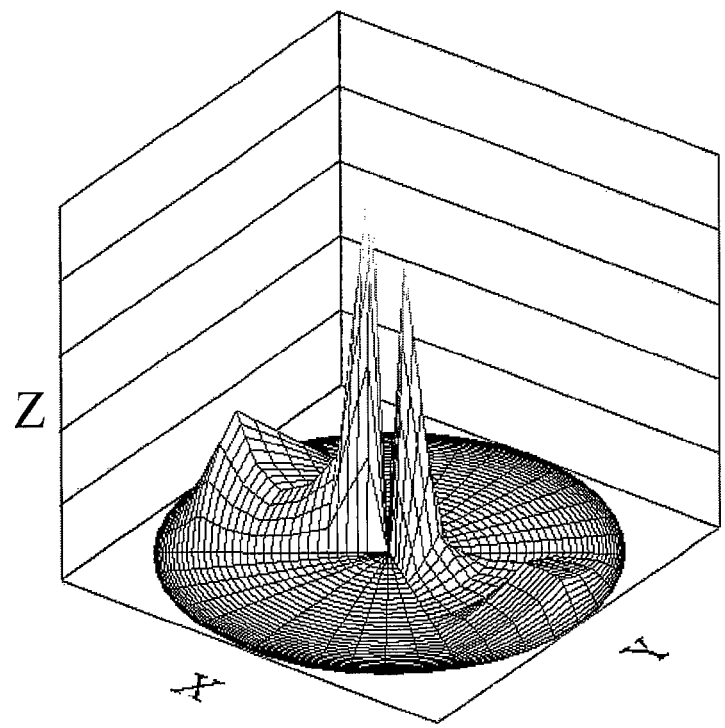

An effect of generating polarized light in the fourth embodiment may be obtained with reference to FIGS. 8A, 8B, 9A, 9B, 10A, and 10B. FIGS. 8A and 8B are schematic view of tests for generating P polarized light and S polarized light respectively in the fourth embodiment according to the present invention. FIGS. 9A and 9B are intensity distribution diagram for generating P polarized light and S polarized light in the fourth embodiment according to the present invention, which are represented with Cartesian coordinates. FIGS. 10A and 10B are angular luminance distribution diagrams for generating P polarized light and S polarized light respectively in the fourth embodiment according to the present invention, which are represented in the manner of polar coordinates.

The tests in FIGS. 8A and 8B are accomplished according to configuration in the fourth embodiment. The light emitting element 10a is an ideal line light source. A black circular point in the center of the drawing is the light emitting element 10a. Because practical test results around the light emitting element 10a are many overlaying light rays (black lines), it is impossible to recognize the light emitting element 10a. Thus, it should be noted that, in this figure, a cyclic region around the light emitting element 10a is inversed, and thus the cyclic blank region does not represent that no light ray passes there through. In the test example, the light emitting element 10 is arranged with the thinned (sectionalized) optical element 20b. After light rays are emitted from the light emitting element 10a, the light intensity (plane distribution) is measured at a suitable height (over the light emitting element 10a, at a measurement location 98). The P polarized light is measured in FIG. 8A. The measurement method is to add a polarizer 96 between the light emitting element 10a and the measurement location 98, so that only the P polarized light may pass through, and the S polarized light is absorbed. In such a manner, it may be ensured that the measured light intensity is the light intensity of the P polarized light. Likewise, FIG. 8B is a schematic view for employing the same method to measure the S polarized light (also, a polarizer 97 is added with its absorption axis perpendicular to that of polarizer 96, so that the S polarized light may pass through, and the P polarized light is absorbed).

Comparing FIG. 8A with FIG. 8B, an obvious difference of light ray distribution may be seen. The number of the light rays of the S polarized light is larger in FIG. 8B, and S polarized light has a more uniform distribution. While the P polarized light in FIG. 8A is only distributed near the center, and has few light rays.

FIGS. 9A and 9B are light intensity distribution diagrams measured in accordance with FIGS. 8A and 8B, respectively. FIGS. 9A and 9B are represented in the manner of iso-intensity contour. It may be seen in the figures that all the P polarized light concentrates near the light emitting element 10a, with a weaker intensity. Circular curves in the figure are iso-intensity contours, and each iso-intensity contour is labeled with a number. The iso-intensity contour takes the largest light intensity as 1, and if a light intensity for a location is only 80% of the largest light intensity, the location is labeled with 0.8. If the largest light intensity is set as 1 unit, the line labeled with 0.7 represents an iso-intensity contour of a 0.7 unit intensity. In FIG. 9B, the light intensity of the whole S polarized light is larger and has a wider distribution, and has a uniform distribution.

FIGS. 10A and 10B are results of the angular luminance distribution corresponding to FIGS. 9A and 9B respectively. The angular luminance distribution is described in polar coordinates, in which the azimuth angle (longitude) is from 0° to 360° and the inclination angle (latitude) is from 0° (center) to 90°. Z axis in FIG. 10A is the luminance received in test direction. The graduation of 1 in Z axis represents the largest luminance tested in the whole test space. The value of 0.8 represents a ratio of the luminance in test direction to the largest luminance. The representation method in FIG. 10B is the same as that in FIG. 10A, except for that FIG. 10B corresponds to FIG. 9B. It may be clearly seen from the figures that, the angle distribution range in FIG. 10B is much smaller than the angle distribution range in FIG. 10A. Thus, the structure of the present invention may not only generate polarized light, but also make the luminous area more uniform, and centralize the luminous angle.

From experimental results of the FIGS. 8A-10B, the obtained degree of polarization is 18:82 (P polarized light:S polarized light), which is a degree of polarization value for an ideal light source. When LED light sources having different divergence degrees are tested in the same conditions, the measured degree of polarization (P:S) may also reach 45:55-35:65, which is obviously much better than 1:1 without employing the present invention (A ratio between a P polarization state and an S polarization state of a light ray generated by a light emitting element is usually 1:1, but after the light ray passes through a polarizer, one type of polarized light is absorbed, and another type of polarized light will also be attenuated. Thus, total efficiency of the light ray after passing through the polarizer is usually lower than 50%. The efficiency here is defined as a ratio of usable polarized light to all light rays).

Figure 11:
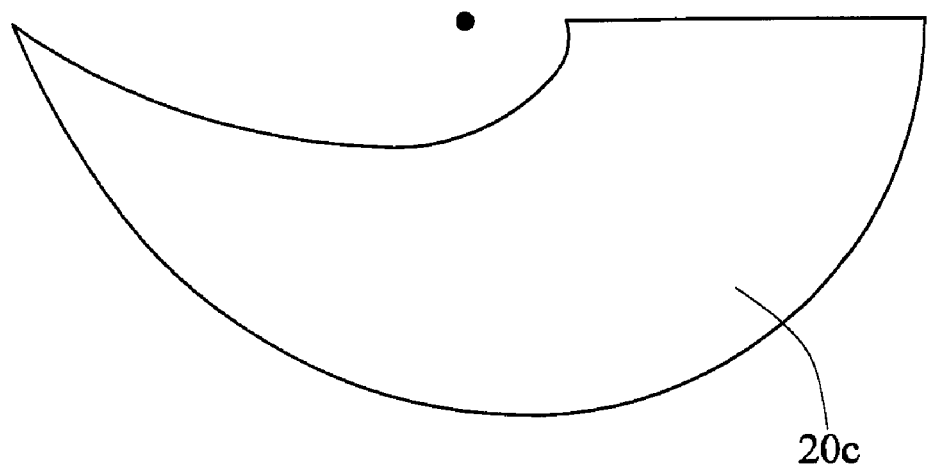
FIG. 11 is a schematic structural view of a fifth embodiment according to the present invention.
Figure 12:
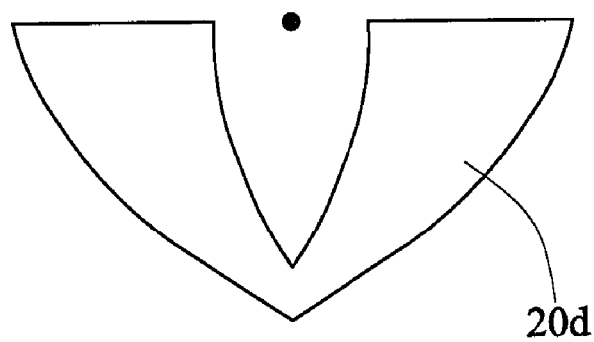
FIG. 12 is a schematic structural view of a sixth embodiment according to the present invention.

FIGS. 11 and 12 are diagrams of a fifth and a sixth embodiments according to the present invention, respectively. In the diagrams it may be seen that, the structures of the optical elements 20c, 20d are different from the structure of the optical element 20 in the first embodiment. However, both of the optical elements 20c, 20d in the fifth and sixth embodiments conform to relations of the Formula (5) and Formula (12).

Figure 13:
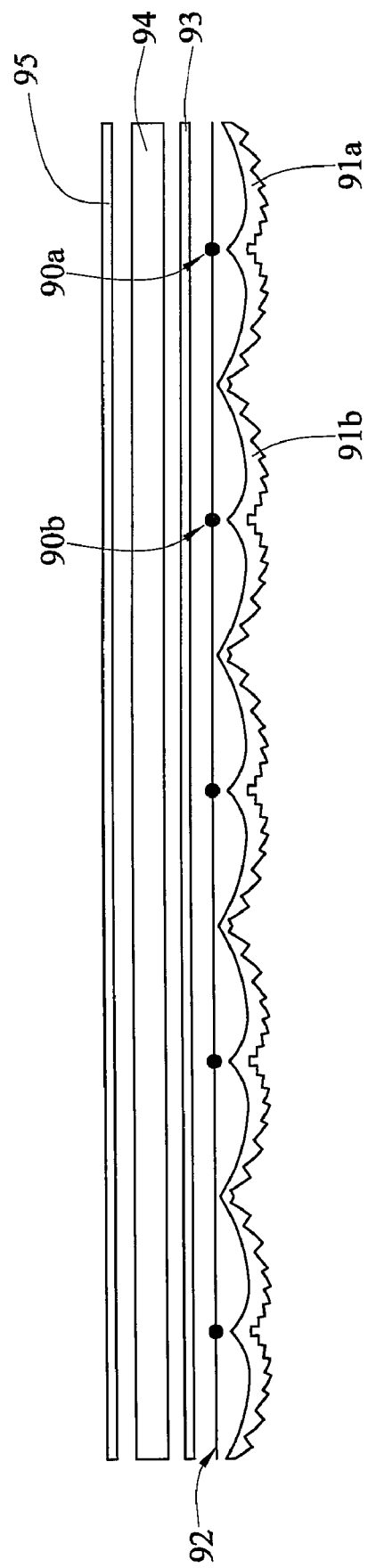
FIG. 13 is a schematic structural view of a seventh embodiment applied in a liquid crystal display according to the present invention.

FIG. 13 is a schematic view of a seventh embodiment according to the present invention applied in a liquid crystal display. It may be seen from the figure that the seventh embodiment of the present invention includes a plurality of light emitting elements 90a, 90b, a plurality of optical elements 91a, 91b, and a reflector 92. The light emitting elements 90a, 90b and the optical elements 91a, 91b correspond to each other and are arranged in an array. A first polarizer 93, a liquid crystal panel 94, and a second polarizer 95 are disposed in turn above the light emitting elements 90a, 90b and the reflector 92. Thus, by using the present invention as the backlight module of this liquid crystal display (this example is, but not limited to, a direct-type backlight module), more polarized light rays than a conventional technology may be obtained.

In FIG. 13, the optical elements 20b in the fourth embodiment according to the present invention are arranged in an array, but the present invention is not limited to this. Other embodiments of the optical element according to the present invention may also be applied to different fields, optionally arranged in one-dimensional or two-dimensional array, so as to achieve a preferred degree of polarization.

Figure 14:
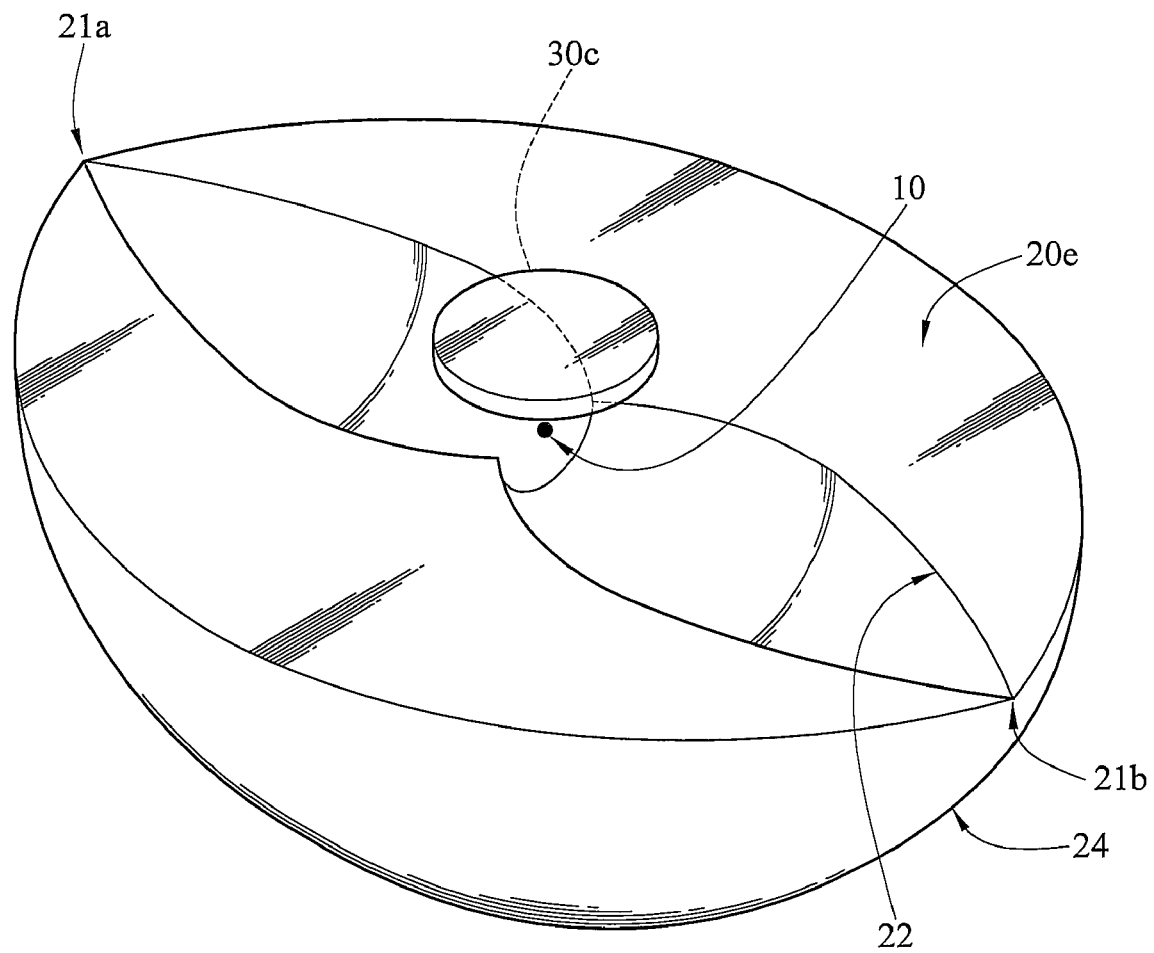
FIG. 14 is a schematic structural view of an eighth embodiment of the present invention.

Finally, FIG. 14 is a 3D structure extended from the eighth embodiment according to the present invention. Referring to FIGS. 3 and 14, the light emitting element is a point light source 10. A profile of the optical element 20e is formed by rotating optical element 20 in the first embodiment by 180 degrees with X axis in FIG. 3 as symmetrical axis. That is to say, the light splitting face 22 and the reflection face 24 has two intersection points 21a, 21b. A connecting line between the light emitting element 10 and the intersection point 21a (or 21b) is a symmetrical axis (i.e., X axis in FIG. 3). The symmetrical axis is a line from the light emitting element 10 along $r_0$ direction. The light splitting face 22 is symmetrical about the symmetrical axis, and the reflection face 24 is also symmetrical about the symmetrical axis (X axis in FIG. 3).

In the eighth embodiment, the reflector 30c is a reflector in the form of a plane, which is disposed right over the light emitting element 10. The reflector 30c assumes a circular shape when being view from the above. The reflector may also be other shapes, for example, the shape of the reflector 30c may be designed to a shape the same as the upper surface of the optical element 20e.

According to the first to the eighth embodiments of the present invention, the reflectors 30, 30a, 30b, and 30c, the light emitting elements 10, and 10a, and the optical elements 20, 20a, 20b, 20c, 20d, and 20e implemented in different manners are proposed in each embodiment. Although the present invention is illustrated with combinations of the embodiments, the combinations of the embodiments are not used by way of limitation. All combinations that conform to the claims fall within the scope of the present invention.

What is claimed is:

1. A light source module for generating polarized light, comprising:

a light emitting element for generating a light ray;

an optical element having a light splitting face and a reflection face, wherein the light splitting face receives the light ray, an incident angle provided for the light ray to be incident to the light splitting face is within a range from a Brewster's Angle $(\theta_B)$–15 degrees to $\theta_B$+15 degrees, the light ray is divided into a refraction light and a reflection light after the light ray is irradiated to the light splitting face, the reflection face reflects the refraction light, and the reflection face is substantially perpendicular to a path of the refraction light; and a reflector disposed on one side of the light emitting element, for reflecting the light ray towards the optical element, wherein the optical element is a strip element, a first plane passing through the light emitting element is perpendicular to a major axis of the strip element, an intersection line between the light splitting face and the first plane is an incident curve, an intersection line between the reflection face and the first plane is a reflection curve, an incident angle provided for the light ray to be incident to the incident curve is within a range from $\theta_B$ –15 degrees to $\theta_B$+15 degrees, and the reflection curve is substantially perpendicular to a path of the refraction light.

2. The light source module according to claim 1, wherein a distance between each point of the light splitting face and the light emitting element is r, the shortest distance between the light splitting face and the light emitting element is $r_0$, and the light splitting face satisfies the following formula:

$$r = e^{r_0 \tan \theta \cdot \phi}$$

wherein $\theta$ falls within a range from $\theta_B$–15 degrees to $\theta_B$+15 degrees, and $\phi$ is an included angle of r and $r_0$.

3. The light source module according to claim 2, wherein a path distance of the refraction light from the light splitting face to the reflection face is a, a path distance of the refraction light from the light splitting face to the reflection face corresponding to $r_0$ is $a_0$, and the reflection face satisfies the following formula:

$$a = \frac{n_1}{n_2} \cdot (r_0 - r) + a_0$$

wherein $n_1$ is a refractive index of a medium between the optical element and the light emitting element, and $n_2$ is a refractive index of the optical element.

4. The light source module according to claim 1, wherein a sectional shape of the optical element in parallel to the first plane is a profile formed by the incident curve and the reflection curve.

5. The light source module according to claim 1, wherein the reflection curve is a curve with continuous slope.

6. The light source module according to claim 1, wherein the reflection curve has a plurality of curve sections, and a slope of the reflection curve within each of the curve sections is continuous.

7. The light source module according to claim 6, wherein a connecting line between the curve sections substantially overlays a path of the refraction light at the connection location.

8. The light source module according to claim 1, wherein a distance between each point of the incident curve and the light emitting element is r, the shortest distance between the incident curve and the light emitting element is $r_0$, and the incident curve satisfies the following formula:

$$r = e^{r_0 \tan\theta \cdot \phi}$$

wherein $\theta$ falls within a range from $\theta_B-15$ degrees to $\theta_B+15$ degrees, and $\phi$ is an included angle between r and $r_0$.

9. The light source module according to claim 8, wherein a distance of the refraction light from the incident curve to the reflection curve is a, a distance of the refraction light from the incident curve to the reflection curve corresponding to $r_0$ is $a_0$, and the reflection curve satisfies the following formula:

$$a = \frac{n_1}{n_2} \cdot (r_0 - r) + a_0$$

wherein $n_1$ is a refractive index of a medium between the optical element and the light emitting element, and $n_2$ is a refractive index of the optical element.

10. The light source module according to claim 1, wherein a direction of a major axis of the reflector is perpendicular to the first plane.

11. The light source module according to claim 1, wherein the light emitting element is a line light source, and a direction of a major axis of the line light source is perpendicular to the first plane.

12. The light source module according to claim 11, wherein the line light source is a cold cathode fluorescent lamp (CCFL).

13. The light source module according to claim 1, wherein the light source is a light emitting diode (LED) group arranged in a line.

14. The light source module according to claim 1, wherein an outer surface of the reflection face has a reflection coating, so as to reflect the refraction light.

15. The light source module according to claim 14, wherein the reflection coating is a metal film.

16. The light source module according to claim 1, wherein the incident angle provided for the light ray to be incident to the incident curve is within a range from $\theta_B-5$ degrees to $\theta_B+5$ degrees.

17. The light source module according to claim 16, wherein the incident angle provided for the light ray to be incident to the incident curve substantially equals to $\theta_B$.

18. The light source module according to claim 1, wherein an outer surface of the reflection face has a reflection coating, so as to reflect the refraction light.

19. A light source module for generating polarized light, comprising:
 a light emitting element for generating a light ray;
 an optical element having a light splitting face and a reflection face, wherein the light splitting face receives the light ray, an incident angle provided for the light ray to be incident to the light splitting face is within a range from a Brewster's Angle ($\theta_B$)-15 degrees to $\theta_B+15$ degrees, the light ray is divided into a refraction light and a reflection light after the light ray is irradiated to the light splitting face he reflection face reflects the refraction light, and the reflection face is substantially perpendicular to a path of the refraction light; and
 a reflector disposed on one side of the light emitting element, for reflecting the light ray towards the optical element,
 wherein a surface of the reflector facing the light emitting element is a polarization conversion surface, and the polarization conversion surface is one selected from a group consisting of a scattering surface, a surface with Birefringent characteristic, a surface of liquid crystal film, a surface of a polyethylene terephthalate (PET) film, and a surface of a polyethylene naphthalate (PEN) film.

20. The light source module according to claim 1, wherein the light emitting element is a point light source, a line from the light emitting element along $r_0$ direction is a symmetrical axis, the light splitting face is symmetrical about the symmetrical axis, and the reflection face is symmetrical about the symmetrical axis.

* * * * *